US008766109B2

(12) United States Patent
Duval et al.

(10) Patent No.: US 8,766,109 B2
(45) Date of Patent: Jul. 1, 2014

(54) CABLE CONNECTOR WITH BUSHING ELEMENT

(75) Inventors: Guy Duval, St-Jean-sur-Richelieu (CA); Jean-Claude Goyette, St-Jean-sur-Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 184 days.

(21) Appl. No.: 13/532,999

(22) Filed: Jun. 26, 2012

(65) Prior Publication Data

US 2012/0329311 A1 Dec. 27, 2012

Related U.S. Application Data

(60) Provisional application No. 61/501,475, filed on Jun. 27, 2011.

(51) Int. Cl.
*H02G 3/18* (2006.01)
*H02G 15/02* (2006.01)

(52) U.S. Cl.
USPC .......... 174/659; 174/77 R; 174/650; 174/652; 174/655; 174/660

(58) Field of Classification Search
USPC ................ 174/77 R, 650, 652, 655, 659, 660
See application file for complete search history.

(56) References Cited

U.S. PATENT DOCUMENTS 2,816,949 A 12/1957 Curtiss
3,567,843 A 3/1971 Collins et al.
4,022,966 A 5/1977 Gajajiva
4,066,269 A 1/1978 Linne
4,150,250 A 4/1979 Lundeberg
4,490,576 A 12/1984 Bolante et al.
4,549,755 A 10/1985 Kot et al.
4,629,825 A 12/1986 Lackinger
4,692,561 A * 9/1987 Nattel .......................... 174/655
4,692,562 A 9/1987 Nattel
4,835,342 A 5/1989 Guginsky
5,321,205 A * 6/1994 Bawa et al. .................. 174/655
5,342,096 A 8/1994 Bachle et al.
5,648,639 A 7/1997 Hand (Continued)

FOREIGN PATENT DOCUMENTS

WO 9412821 A1 6/1994
WO 9427079 A1 11/1994
WO 2009144505 A1 12/2009

*Primary Examiner* — Jeremy C Norris
*Assistant Examiner* — Sherman Ng
(74) *Attorney, Agent, or Firm* — Snyder, Clark, Lesch & Chung, LLP

(57) ABSTRACT

A cable connector for receiving a cable includes a substantially tubular connector body having a central bore extending therethrough, a forward end, and a cable receiving end. A gland nut is coupled to the cable receiving end of the connector body, wherein the gland nut is axially movable from a first position relative to the connector body to a second position relative to the connector body. A substantially tubular bushing element is secured between the gland nut and the connector body, wherein the bushing element comprises a tubular body for receiving the cable therethrough. The tubular body of the bushing element includes a flexible portion and a semi-rigid portion, wherein the flexible portion comprises a first hardness to seal the flexible portion to the cable and the semi-rigid portion comprises a second hardness to securely fix the cable relative to the bushing element.

17 Claims, 6 Drawing Sheets

(56) References Cited

U.S. PATENT DOCUMENTS

| | | | | |
|---|---|---|---|---|
| 6,160,221 | A | 12/2000 | Hablutzel | |
| 6,162,995 | A | 12/2000 | Bachle et al. | |
| 6,409,179 | B1 | 6/2002 | Daoud | |
| 6,616,194 | B1 | 9/2003 | Gretz | |
| 7,156,671 | B2 * | 1/2007 | Kauth | 439/98 |
| 7,390,027 | B2 | 6/2008 | Kiely | |
| 2004/0069522 | A1 * | 4/2004 | Jackson | 174/65 SS |

* cited by examiner

CABLE CONNECTOR WITH BUSHING ELEMENT

CROSS-REFERENCE TO RELATED APPLICATION

This application claims priority under 35. U.S.C. §119, based on U.S. Provisional Patent Application No. 61/501,475 filed Jun. 27, 2011, the disclosure of which is hereby incorporated by reference herein.

BACKGROUND OF THE INVENTION

Electrical connectors or fittings have long been used to terminate and connect a variety of cables that carry electrical power or communications-related signals. Such connectors may include strain relief elements for securing the cables and protecting the cable from failures due to abrasion or bending of the cable, pulling-out of the cable, or other similar problems.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

One or more embodiments disclosed herein relate to improved cable connectors (sometimes referred to as cable fittings or strain relief fittings) for terminating or receiving cables, such as electrical and communications cables. More specifically, the described cable connectors may include a bushing element having a central bore therethrough for receiving a cable. Consistent with implementations described herein, the bushing element may include a compound or multi-material configuration that has a first flexible portion and a second semi-rigid portion. Furthermore, the bushing element may include a number of inwardly projecting resilient tabs. Upon insertion of a cable through the bore of the bushing, the flexible portion of the bushing element may deform about the cable to automatically create a sealed interface. Additionally, a connector body may receive the bushing and, upon axial advancement in the body, the resilient tabs in the semi-rigid portion of the bushing element may grip and secure the cable to prevent or reduce the likelihood that the cable may be pulled out of the fitting.

Figure 1A:
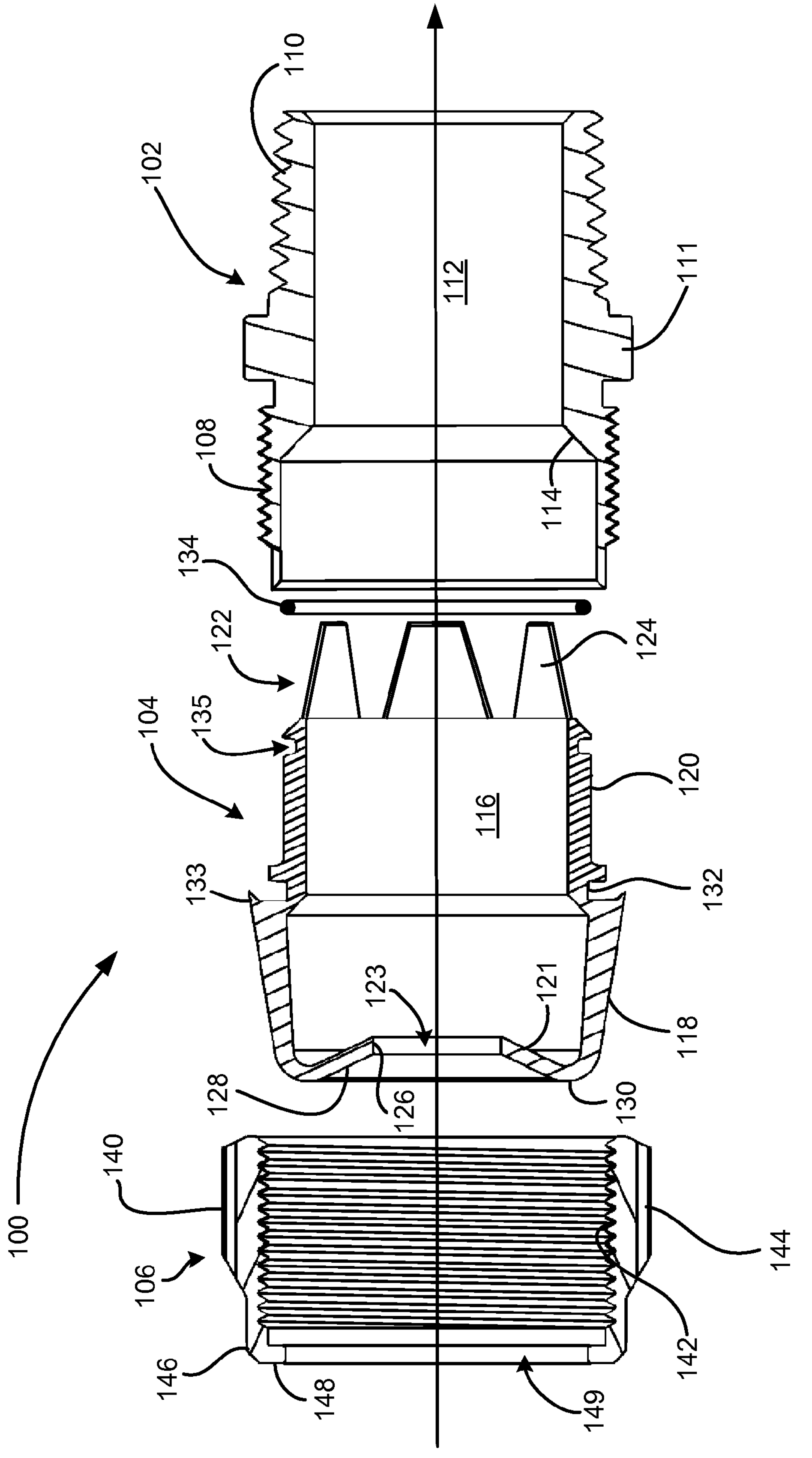
FIG. 1A is an exploded cross-sectional diagram of a cable connector consistent with implementations described herein.
Figure 1B:
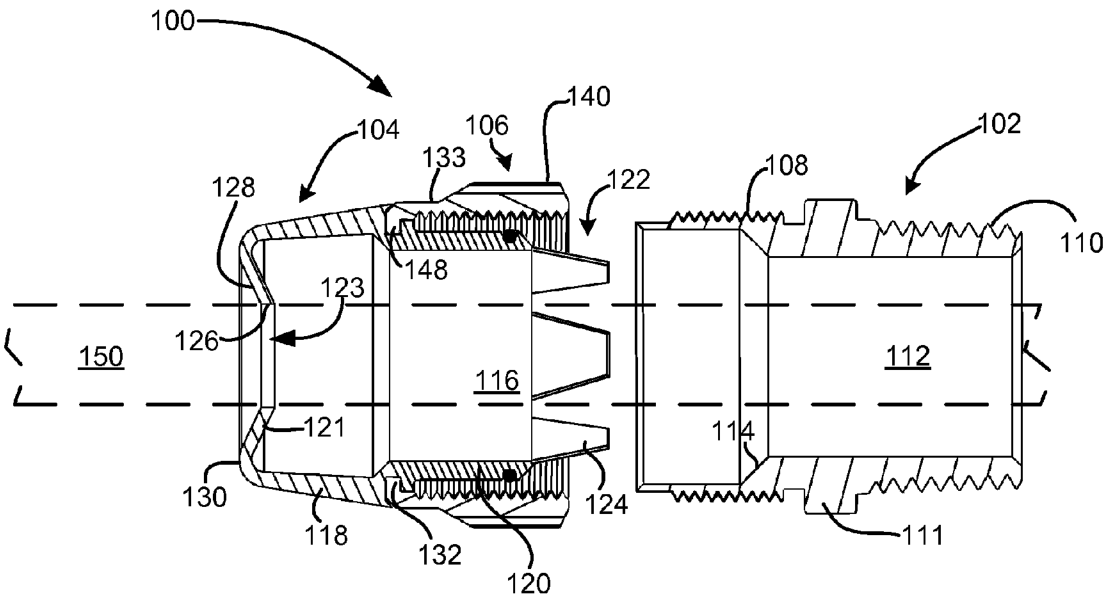
FIG. 1B is a partially exploded cross-sectional diagram of the cable connector of FIG. 1 in a partially assembled configuration.
Figure 1C:
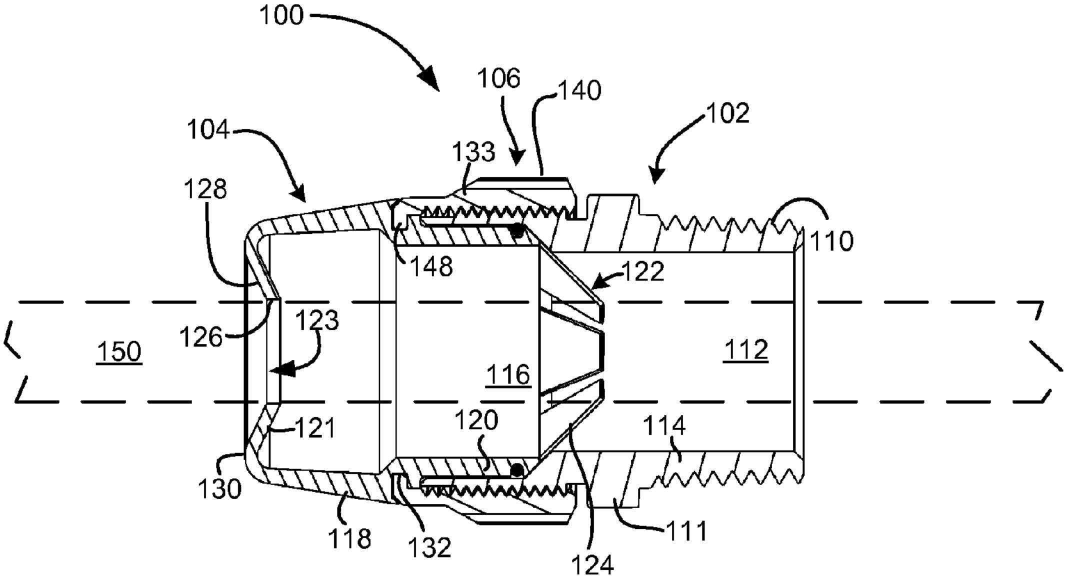
FIG. 1C is a cross-sectional diagram of the cable connector of FIG. 1 in an assembled configuration.

FIG. 1A is an exploded cross-sectional diagram of a cable connector 100 consistent with implementations described herein. FIG. 1B is a partially exploded cross-sectional diagram of cable connector 100 in a partially assembled configuration. FIG. 1C is a cross-sectional diagram of cable connector 100 in an assembled configuration. FIGS. 2A, 2B, 2C, and 2D are isometric, cross-sectional isometric, side, and end views, respectively, of cable connector 100. As illustrated in FIGS. 1A-1C and 2A-2D, connector 100 may include a connector body 102, a bushing element 104, and a gland nut 106.

In one implementation, connector body 102 may include an elongated, hollow, generally tubular member having an enlarged cable receiving end 108 and a smaller opposed conductor egressing end 110. As shown, cable receiving end 108 may include external threads formed on a portion thereof for attaching to gland nut 106 in the manner described below. Similarly, conductor egressing end 110 may include external threads to facilitate attachment of connector 100 to a wall of an electrical box or other structure (not shown). An intermediate portion of connector body 102 may include a tool engagement portion 111 for engaging a torque applying tool, such as a wrench, during installation of connector 100.

Connector body 102 may include an internal central bore 112 extending along a central longitudinal axis between cable receiving end 108 and conductor egressing end 110. In addition, central bore 112 may include an angled annular portion 114 for engaging bushing element 104 in the manner described below. As shown, angled annular portion 114 may have a rearward inside diameter that is larger than a forward inside diameter, such that central bore 112 is made smaller by angled annular portion 114 (when viewed in a forward direction, as indicated by arrow A in FIG. 1A).

As shown in FIG. 1A, bushing element 104 may be configured for positioning within cable receiving end 108 of connector body 102 and may include a substantially tubular configuration having an axial bore 116 formed therethrough. More specifically, bushing element 104 may include a rearward portion 118 and a forward portion 120. Consistent with embodiments described herein, rearward portion 118 and a forward portion 120 may be formed of materials having different degrees of resiliency. For example, rearward portion 118 may be formed of a more resilient (e.g., softer) rubber or polymer (or other rubber-like material) and forward portion 120 may be formed of a less resilient (e.g., harder) material. For example, rearward portion 118 may be formed of a Shore-A hardness material (on the Shore hardness scale) and forward portion 120 may be formed of a Shore-D material. For example, rearward portion 118 may be formed of rubber and forward portion 120 may be formed of plastic. In some implementations, rearward portion 118 and forward portion 120 may be securely or permanently coupled, such as via a bonding adhesive, or the like, while in other implementations, rearward portion 118 and forward portion 120 are non-permanently coupled.

Rearward portion 118 of bushing element 104 may include a seal portion 121 comprising a substantially circular opening 123 in an end of rearward portion 118, thus forming an annular rim 126. More specifically, rearward portion 118 may form a radial end cap over a cable receiving end of bushing element 104. Sealing portion 121 may be formed in the radial end cap to provide access to bore 116, as shown in FIG. 2A.

Consistent with embodiments described herein, an inside diameter of rim 126 may be smaller (e.g., slightly smaller) than an outside diameter of a cable 150 (depicted in dashed lines in FIGS. 1B and 1C) to be received and secured by connector 100. Upon insertion of cable 150 into opening 123, rim 126 may sealingly engage the outer surface of cable 150, thereby automatically forming a seal between bushing element 104 and cable 150.

Furthermore in the exemplary embodiment of FIGS. 1A-2D, seal portion 121 may include a beveled or chamfered surface 128, resulting in circular opening 123 being positioned axially forward (in the direction of arrow A) from an end surface 130 of rearward portion 118. Beveled surface 128 may increase the ease with which cable 150 is inserted into opening 123 by reducing the likelihood that an end of cable 150 will slip off of end surface 130. In another exemplary embodiment, as shown in FIG. 3, bushing element 104 may include a substantially flat end surface 130 having central opening 123 formed therein.

In one implementation, an outside surface of bushing element 104 may include an annular groove 132 formed in an intermediate portion thereof. As shown in FIG. 1B, annular groove 132 may be configured to engage and retain a flange or lip portion 148 of gland nut 106. Threading or otherwise securing gland nut 106 to connector body 102 causes lip portion 148 to exert a force on groove 132, thereby causing bushing element 104 to advance axially within central bore 112. As shown in FIG. 1A, groove 132 may include an angled cover portion 133 in one exemplary embodiment. Angled cover portion 133 may be configured to overly lip portion 148 of gland nut 106 upon seating of gland nut 106 within groove 132. This relationship may provide a substantially sealed interface between bushing element 104 and gland nut 106 to prevent moisture from entering connector body 102. In some implementations, an o-ring 134 may be positioned within a groove 135 in bushing element 104 to further provide a seal between bushing element 104 and body 102.

Figure 2B:
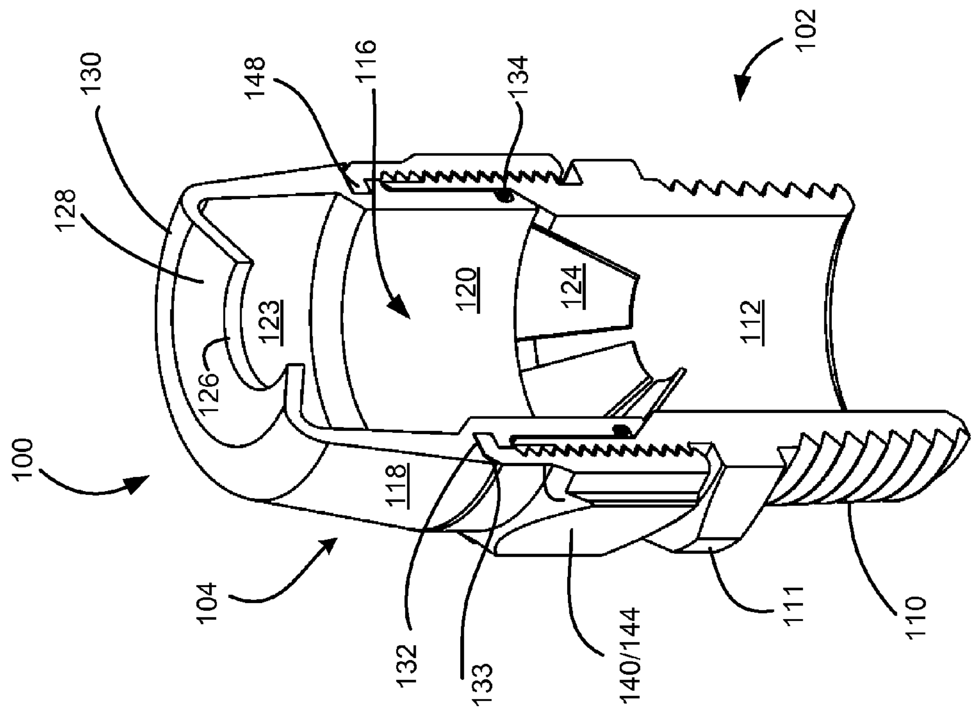
FIG. 2B is a cross-sectional isometric diagram of the cable connector of FIG. 2A.
Figure 2A:
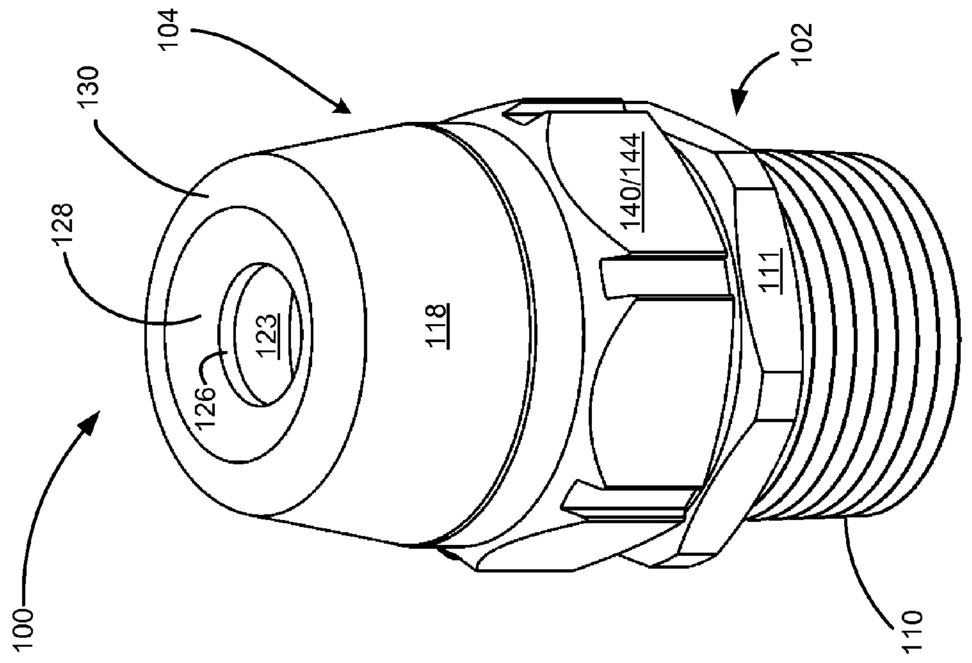
FIG. 2A is an isometric view of the cable connector of FIG. 1C.
Figure 3:
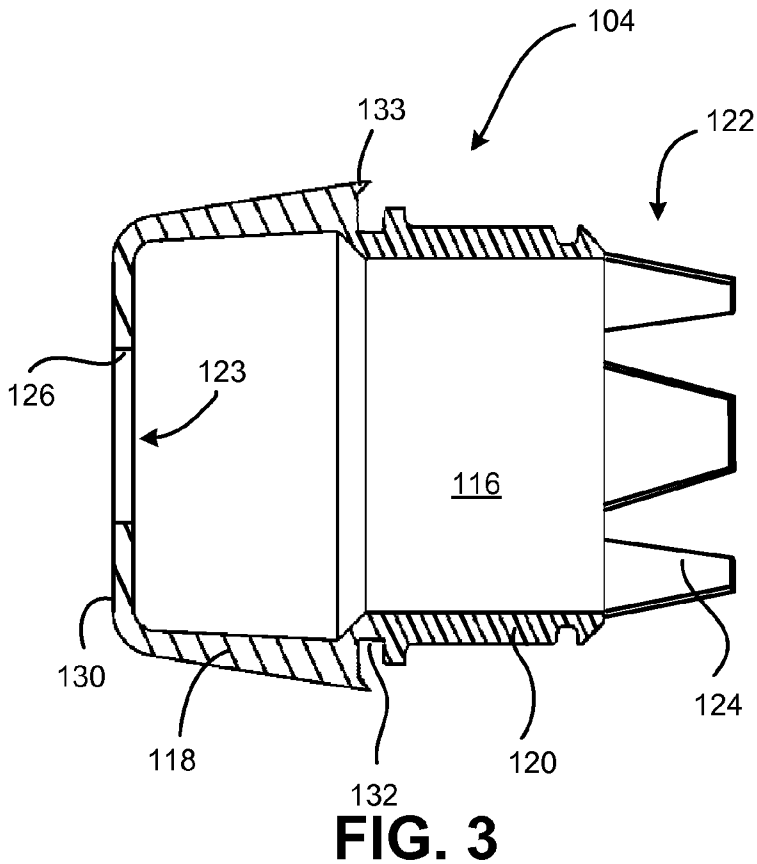
FIG. 3 is a cross-sectional diagram of a bushing element consistent with another exemplary implementation.

Referring to FIGS. 1A, 1C, and 2B, forward portion 120 of bushing element 104 may include a forwardly tapering frustoconical end 122 formed as a number of gripping fingers 124 (sometimes referred to as tabs or prongs). Gripping fingers 124 in forward frustoconical end 122 may be configured to engage angled portion 114 of connector body 102 such that upon coupling of gland nut 106 to connector body 102, forward portion 120 of bushing element 104 engages an outer cable surface of inserted cable 150. Such engagement secures the cable within bushing element 104 and connector 100 and prevents or reduces a likelihood of undesired removal or pull-out of cable 150 upon assembly of connector 100.

Figure 2D:
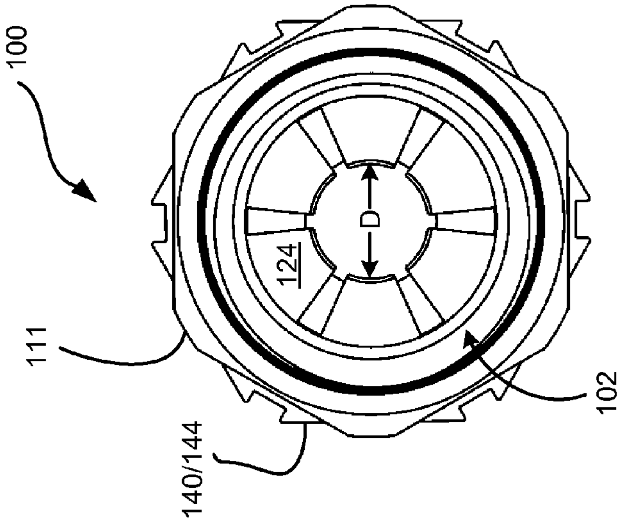
FIG. 2D is an end view of the cable connector of FIG. 1C.
Figure 2C:
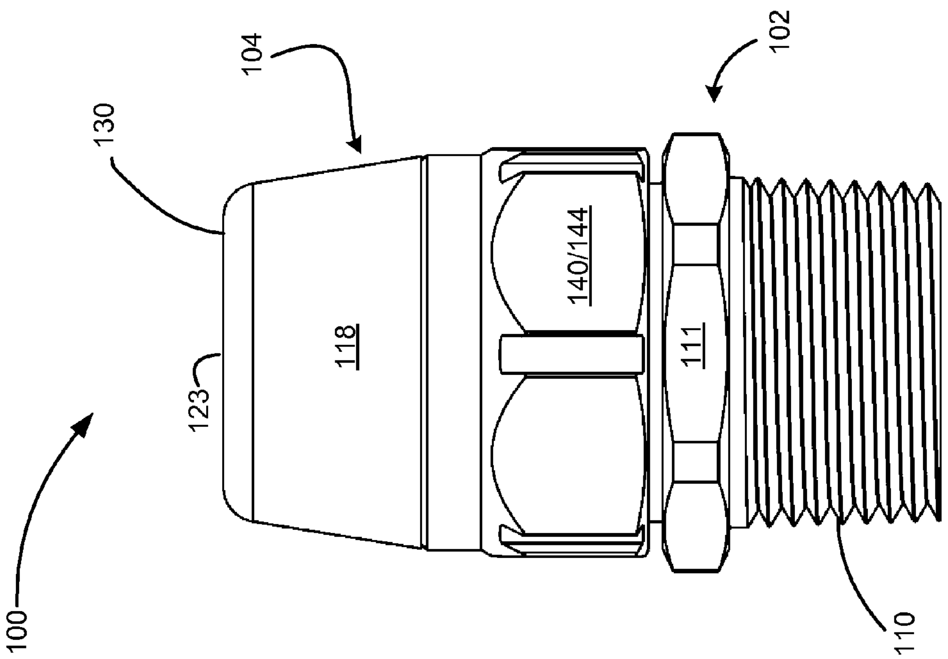
FIG. 2C is a side view of the cable connector of FIG. 1C.

In the embodiment shown in FIGS. 1A-2D, bushing element 104 includes six gripping fingers 124, although any suitable number of gripping fingers 124 may be provided. Consistent with implementations described herein, gripping fingers 124 may each include a substantially trapezoidal configuration, with a rearward portion of each finger 124 having a width greater than a forward portion of each finger 124. This configuration allows the forward portions of fingers 124 to collapse toward each other upon deflection by angled surface 114. Upon maximum deflection (as illustrated in FIGS. 1B and 2D), the forward ends of gripping fingers 124 may together define an inside diameter D (as shown in FIG. 2D) that is slightly smaller than an outside diameter of electrical cable 150. Moreover, the semi-rigid material of forward portion 120 may provide for a secure gripping engagement between the outer surface of electrical cable 150 and bushing element 104.

Furthermore, the resilient nature of both rearward portion 118 and gripping fingers 124 in forward portion 120 of bushing element 104 may accommodate insertion of cables of varying diameters, with larger diameter cables imparting additional amounts of deflection on fingers 124 relative to smaller diameter cables. For example, larger diameter cables may deflect rim 126 farther than smaller diameter cables. Similarly, larger diameter cables may be even more securely gripped by gripping fingers 124 through an increased difference between an outside diameter of cable 150 and the diameter D of gripping fingers 124.

Gland nut 106 may include a generally annular configuration having an outer surface 140 and an inner surface 142. Outer surface 140 may include a hexagonal tool engaging portion 144 on at least a portion thereof for engaging a torque applying tool, such as a wrench. Inner surface 142 may include internal threads thereon. The internal threads of gland nut 106 may be configured for cooperative engagement with the external threads on cable receiving end 108 of connector body 102. In other implementations, gland nut 106 and connector body 102 may be secured together via non-threaded means, such as via crimping, clamping, a push-on connection, etc.

As shown in FIG. 1A, a rearward end 146 of gland nut 106 may have a flange 148 projecting inwardly therefrom to form a nut opening 149. The inside diameter of flange 148 (and hence nut opening 149) may be sized slightly smaller than a maximum outside diameter of rearward portion 118 of bushing element 104. During assembly, flange 148 may be configured to engage annular groove 132 in bushing element 104, thereby capturing bushing element 104 within connector body 102 in a compressed configuration. For example, flexible rearward portion 118 of bushing element 104 may be forcibly inserted through nut opening 149 in gland nut 106 and advanced through nut opening 149 until flange 148 engages annular groove 132. The flexible nature of rearward portion 118 may facilitate sufficient deformation of rearward portion 118 to allow rearward portion 118 to slide along flange 148 until flange 148 engages annular groove 132, thus arresting advancement of bushing element 104 relative to gland nut 106.

Consistent with implementations described herein, connector body 102, and gland nut 106 may be formed of any suitable material, including conductive and non-conductive materials, such as such as aluminum, copper, stainless steel, nylon, or other polymers. As described above, bushing element 104 may be formed of two different rubber or other elastomeric materials, with a forward portion 120 having a hardness greater than that of rearward portion 118.

Figure 4:
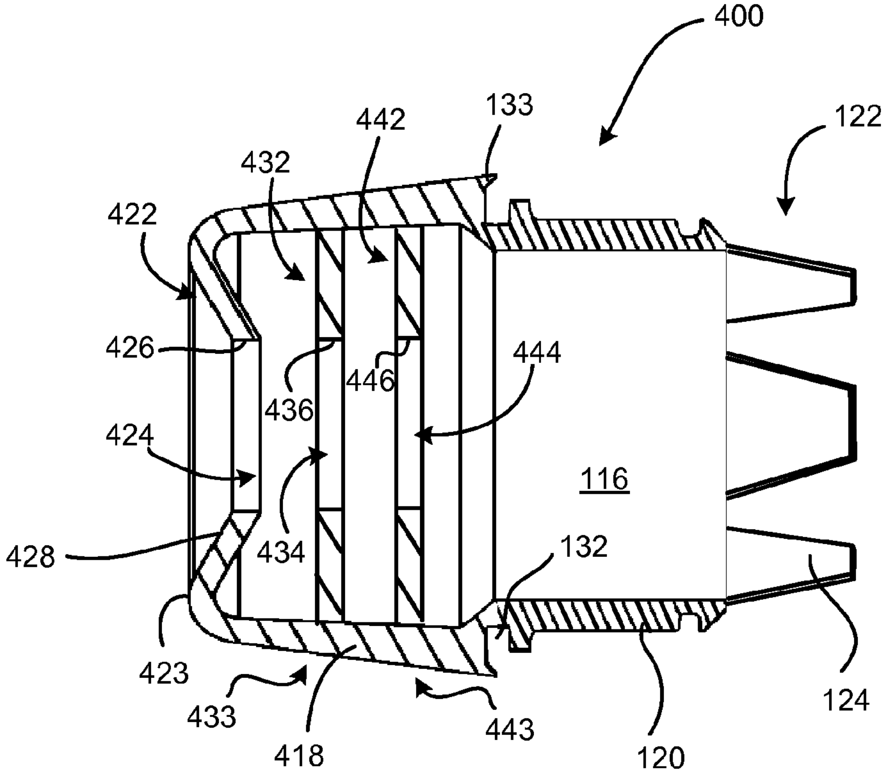
FIG. 4 is a cross-sectional diagram of a bushing element consistent with still another exemplary implementation.

FIG. 4 is a cross-sectional diagram of a bushing element 400 consistent another exemplary implementation described herein. As shown, bushing element 400 may include forward portion 120, as described above, and rearward portion 418. Consistent with the embodiment of FIG. 4, rearward portion 418 may include a first seal portion 422, a second seal portion 432, and a third seal portion 442. First seal portion 422 may extend radially inwardly from an end surface 423 of rearward portion 418 to from a first circular opening 424 with a first annular rim 426. Second seal portion 432 may extend radially inwardly from a first intermediate portion 433 of rearward portion 418 to from a second circular opening 434 with a second annular rim 436. Second circular opening 434 may be coaxial with first circular opening 424 in first seal portion 422. Third seal portion 442 may extend radially inwardly from a second intermediate portion 443 of rearward portion 418 to from a third circular opening 444 with a third annular rim 446. Similar to second opening 434, third circular opening 444 may be coaxial with first circular opening 424 in first seal portion 422.

As described above in relation to FIGS. 1A-2D, rearward portion 418 may be formed of a rubber or other flexible polymer configured to provide a flexible and conforming engagement with the outside surface of a cable. Seal portions 422, 432, and 442 may have suitable thicknesses for allowing receipt and deformation of the seal portions 422, 432, and 442, upon insertion of a cable into openings 424, 434, and 444.

Consistent with embodiments described herein, an inside diameter of openings 424, 434, and 444 may be smaller (e.g., slightly smaller) than an outside diameter of a cable to be received and secured by connector 100. Upon insertion of a cable into openings 424, 434, and 444 (e.g., by pushing an end of the cable into the openings), rims 426, 436, and 446 may each sealingly engage the outer surface of cable 150, thereby forming redundant seals between bushing element 104 and cable 150 in an automatic manner, without requiring additional actions on the part of the installer.

Furthermore in the exemplary embodiment of FIG. 4, first seal portion 422 may include a beveled or chamfered surface 428, resulting in first circular opening 424 being positioned axially forward from end surface 423 of rearward portion 418. As described above, beveled surface 428 may increase the ease with which a cable is inserted into opening 424. In other embodiments, rearward portion 418 of bushing element 400 may include a substantially flat end surface 423 having central opening 424 formed therein.

Figure 5:
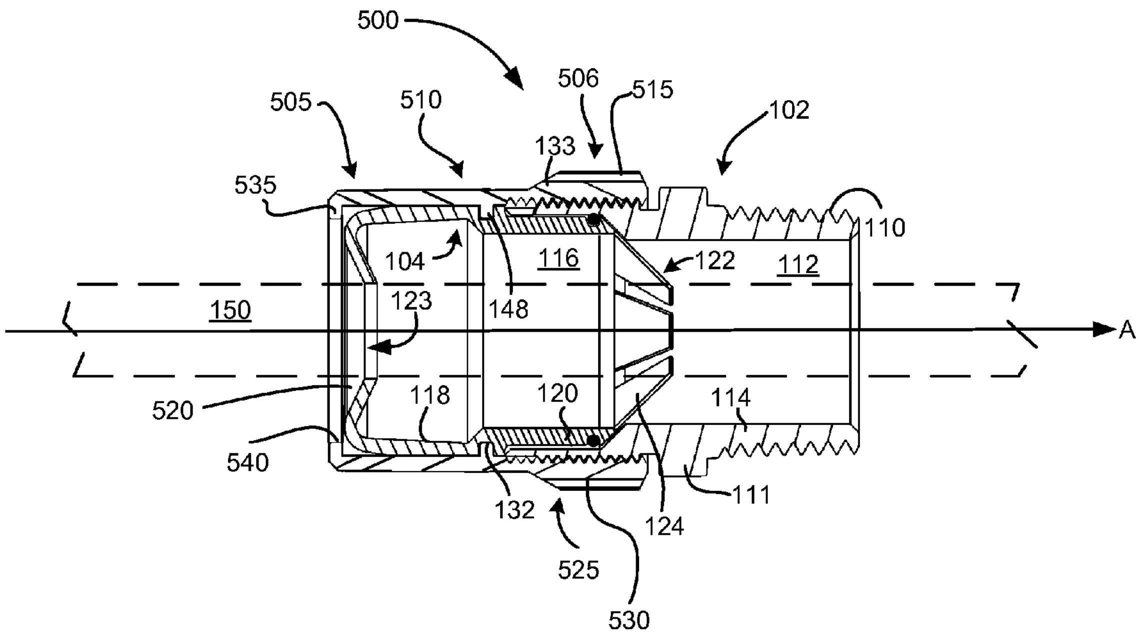
FIG. 5 is a cross-sectional diagram of a cable connector having a gland nut consistent with another exemplary implementation.

FIG. 5 is a cross-sectional diagram of a cable connector 500 having a gland nut consistent 506 with another exemplary implementation. As shown, cable connector 500 may include connector body 102 and bushing element 104 consistent with the description above in relation to FIGS. 1A-2D. Gland nut 506 may include a generally tubular configuration having a rearward end 505, an intermediate portion 510, a forward end 515, and a bore 520 extending therethrough. In addition, gland nut 506 may include an outer surface 525 and an inner surface 530. As shown in FIG. 5, outer surface 525 proximate forward end 515 may include a hexagonal tool engaging portion 530 for engaging a torque applying tool, such as a wrench. Inner surface 530 proximate forward end 515 may include internal threads thereon configured for cooperative engagement with the external threads on cable receiving end 108 of connector body 102. Gland nut 506 may be formed of any suitably rigid or semi-rigid material, including conductive and non-conductive materials, such as such as aluminum, copper, stainless steel, nylon, or other semi-rigid polymers.

As shown in FIG. 5, intermediate portion 510 may have a flange 535 projecting radially inwardly therefrom. As described briefly above in relation to FIG. 1A, flange 535 (similar to flange 148 in FIG. 1A) may be configured for engagement within annular groove 132 in bushing element 104, thereby capturing bushing element 104 within connector body 102 in a compressed configuration.

Rearward portion 505 of gland nut 506 may project axially rearwardly from intermediate portion 510 and may include an annular rim 540 extending radially inward therefrom. As shown in FIG. 5, upon assembly, rearward portion 505 may protect rearward portion 118 of bushing element 104 therein by forming a rigid or semi-rigid barrier around rearward portion 118. Rim 540 may protect the edges or corners of rearward portion 118 and may allow cable 150 to be inserted into bushing element 104.

Embodiments described herein allow efficient and easy installation of a cable into the described cable fittings. By providing a one-piece bushing having multiple materials, fitting tightening force may be reduced. In addition, tool-less hand tightening of the above-described connector may result in sufficient pull-out resistance. Furthermore, the above-described implementations eliminate the need for an additional slip ring component for engaging the gland nut, since the gland nut engages the forward portion (e.g., the harder portion) of the bushing element.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A cable connector for receiving a cable, comprising:

a substantially tubular connector body having a central bore extending therethrough, a forward end, and a cable receiving end;

a gland nut coupled to the cable receiving end of the connector body, wherein the gland nut is axially movable from a first position relative to the connector body to a second position relative to the connector body; and a bushing element secured between the gland nut and the connector body, wherein the bushing element comprises a tubular body for receiving the cable therethrough, wherein the tubular body includes a flexible portion and a semi-rigid portion, wherein the flexible portion has a first hardness to automatically seal the flexible portion to the cable and the semi-rigid portion has a second hardness to securely fix the cable relative to the bushing element, wherein the flexible portion of the bushing element further comprises:

an end surface projecting radially inwardly from a rearward end of the flexible protion to form a lip;

a seal portion forming a substantially circular opening in the lip, wherein an inside diameter of the substantially circular opening in the seal portion is smaller than an outside diameter of the cable.

2. The cable connector of claim 1, wherein axial movement of the gland nut from the first position to the second position causes inward compression of the semi-rigid portion toward the cable to secure the cable within the cable connector.

3. The cable connector of claim 2, wherein the central bore includes an angled inner surface, and wherein a forward portion of the semi-rigid portion of the bushing element engages the angled inner surface in the central bore when the gland nut is in the second position.

4. The cable connector of claim 2, wherein the semi-rigid portion further comprises:

a number of resilient fingers projecting axially from the tubular body of the bushing element.

5. The cable connector of claim 4, wherein ends of the resilient fingers together define an inside diameter smaller than an outside diameter of the cable upon axial movement of the gland nut from the first position to the second position.

6. The cable connector of claim 1, wherein the flexible portion comprises a first material and the semi-rigid portion comprises a second material, wherein the first material is different from the second material.

7. The cable connector of claim 6, wherein the first material comprises a rubber-like polymer and the second material comprises a semi-rigid polymer.

8. The cable connector of claim 6, wherein the flexible portion is permanently coupled to the semi-rigid portion.

9. The cable connector of claim 1, wherein the seal portion includes a beveled surface to guide the cable to the circular opening.

10. The cable connector of claim 1, wherein the flexible portion of the bushing element further comprises:

a second seal portion projecting radially inwardly from the rearward portion of the bushing element, wherein the second seal portion is positioned axially forward of the seal portion, wherein the second seal portion includes a second substantially circular opening for receiving the cable therein.

11. The cable connector of claim 1, wherein the gland nut comprises a substantially tubular body having a rearward end, an intermediate portion, wherein the rearward end of the gland nut is configured to cover the flexible portion in the bushing element.

12. A bushing element for use in a strain relief cable fitting, comprising:

a substantially tubular body comprising a rearward portion and a forward portion, wherein the tubular body is configured to receive a cable therethrough, wherein the rearward portion comprises a first hardness to automatically seal the rearward portion to the cable and the forward portion comprises a second hardness to securely fix the cable relative to the bushing element, wherein the forward portion comprising a compression portion configured to compress toward the cable during installation of the strain relief cable fitting, wherein the rearward portion further comprises:

an end surface projecting radically inward from a rearward end of the rearward portion to form a lip;

a first portion forming a substantially circular opening in the lip, wherein an inside diameter of the substantially circular opening in the first seal portion is smaller than the outside diameter of the cable.

13. The bushing element of claim 12, wherein the forward portion further comprises a number of resilient fingers projecting axially from the tubular body.

14. The bushing element of claim 12, wherein the rearward portion comprises a first material and the forward portion comprises a second material, wherein the first material is different from the second material.

15. The bushing element of claim 14, wherein the first material comprises a rubber-like polymer and the second material comprises a semi-rigid plastic.

16. The bushing element of claim 14, wherein the rearward portion is permanently coupled to the forward portion.

17. The bushing element of claim 12, wherein the rearward portion further comprises:

a second seal portion projecting radially inwardly the rearward portion, wherein the second seal portion is positioned axially forward of the seal portion, wherein the second seal portion includes a second substantially circular opening for receiving the cable therein.

* * * * *

UNITED STATES PATENT AND TRADEMARK OFFICE

CERTIFICATE OF CORRECTION

PATENT NO. : 8,766,109 B2
APPLICATION NO. : 13/532999
DATED : July 1, 2014
INVENTOR(S) : Guy Duval et al.

It is certified that error appears in the above-identified patent and that said Letters Patent is hereby corrected as shown below:

In the Claims:

Claim 12, column 8, line 9 should read: "an end surface projecting radially inwardly from a rear-"
Claim 12, column 8, line 11 should read: "a first seal portion forming a substantially circular opening in"

Signed and Sealed this
Thirtieth Day of September, 2014

Michelle K. Lee
*Deputy Director of the United States Patent and Trademark Office*